United States Patent
Romanato et al.

[11] Patent Number: 6,149,852
[45] Date of Patent: Nov. 21, 2000

[54] METHOD FOR OBTAINING A SHOE, AND SHOE OBTAINED WITH SAID METHOD

[75] Inventors: Mariarosa Romanato, Stra; Franco Priarollo, Cornuda; Riccardo Perotto, Volpago del Montello; Alessandro Pozzobon, Paderno di Ponzano Veneto, all of Italy

[73] Assignee: Benetton Sportsystem S.p.A., Trevignano, Italy

[21] Appl. No.: 09/007,189

[22] Filed: Jan. 15, 1998

Related U.S. Application Data

[63] Continuation-in-part of application No. 08/654,496, May 28, 1996, Pat. No. 5,727,271.

[51] Int. Cl.[7] ............................. B29D 31/50; A43C 13/08
[52] U.S. Cl. .................. 264/229; 264/245; 264/246; 264/247; 264/263; 264/266; 264/271.1; 264/273; 264/244; 12/142 RS; 12/142 E; 12/142 F; 12/142 T; 36/14
[58] Field of Search ..................... 264/244, 263, 264/259, 266, 245, 246, 247, 271.1, 273, 229; 12/142 RS, 142 E, 142 F, 142 T; 36/14

[56] References Cited

U.S. PATENT DOCUMENTS

| | | |
|---|---|---|
| 1,716,790 | 6/1929 | Mitchell . |
| 2,306,306 | 12/1942 | Ferrettie . |
| 2,317,880 | 4/1943 | Bingham et al. . |
| 2,403,442 | 7/1946 | Klaus . |
| 3,099,885 | 8/1963 | Jordan et al. . |
| 3,812,604 | 5/1974 | Sato ............................................ 36/14 |
| 4,255,825 | 3/1981 | Rigon . |
| 4,351,537 | 9/1982 | Seidel . |
| 4,364,190 | 12/1982 | Yonkers . |
| 4,453,727 | 6/1984 | Bourque . |
| 4,662,018 | 5/1987 | Autry . |
| 4,706,316 | 11/1987 | Tanzi ..................................... 12/142 T |
| 4,910,889 | 3/1990 | Bonaventure et al. . |
| 5,038,500 | 8/1991 | Nicholson . |
| 5,171,033 | 12/1992 | Olson et al. . |
| 5,397,141 | 3/1995 | Hoshizaki et al. . |
| 5,437,466 | 8/1995 | Meibock et al. . |

FOREIGN PATENT DOCUMENTS

| | | |
|---|---|---|
| 0018663 | 5/1980 | European Pat. Off. . |
| 0347346 | 6/1989 | European Pat. Off. . |
| 1350139 | 12/1963 | France . |
| 2208279 | 6/1974 | France . |
| 4129361 | 7/1992 | Germany . |
| 5-253001 | 10/1993 | Japan . |
| 6-30809 | 2/1994 | Japan . |
| 191834 | 7/1937 | Switzerland . |
| 1375665 | 11/1974 | United Kingdom . |
| 2034170 | 6/1980 | United Kingdom . |
| 94/15493 | 7/1994 | WIPO . |

OTHER PUBLICATIONS

Patent Abstract of Japan vol. 14, No. 314 (C–737) Jul. 5, 1990 & JP–A–02 109502 (Moon Star Co.) Apr. 23, 1990.

*Primary Examiner*—Jan H. Silbaugh
*Assistant Examiner*—Suzanne E. McDowell
*Attorney, Agent, or Firm*—Guido Modiano; Albert Josif; Daniel O'Byrne

[57] ABSTRACT

A method for manufacturing a shoe, which includes the steps of:

arranging an upper-insole assembly about a last;

coupling an intermediate member comprising a toe portion and a heel portion to a lower region of the upper-insole assembly arranged about the last; and arranging the intermediate member in a mold and introducing plastic material into the mold so as to form an injected plastic material member which surrounds the intermediate member and which is integrally connected with both the intermediate member and the upper-insole assembly.

4 Claims, 10 Drawing Sheets

METHOD FOR OBTAINING A SHOE, AND SHOE OBTAINED WITH SAID METHOD

CROSS-REFERENCE TO RELATED APPLICATIONS

This application is a continuation-in-part of application Ser. No. 08/654,496, filed on May 28, 1996, now U.S. Pat. No. 5,727,271.

BACKGROUND OF THE INVENTION

The present invention relates to a method for manufacturing a shoe, and to a shoe obtained with such method.

Conventional sports shoes, for example for mountaineering, are produced by using a nonrigid sock to which an upper, open at the bottom, is coupled perimetrically and in an upward region by stitching. The upper is in fact subsequently placed at a last, and its ends are turned over on an adapted insole and are stitched or glued thereto to obtain a closed configuration that is adapted to fully surround the nonrigid sock. A sole provided with a tread is then coupled below the upper by injection-molding or stitching.

EP 0 152 783 discloses a flat sole that has a box-like shape in the region of the toe and a counter in the heel region; these parts are connected by lateral walls and the sole comprises selective support means that are associated with the sole and are adapted to vary its flexibility. The sole and its components are then stitched or glued to the upper.

U.S. Pat. No. 4,706,316 discloses a method for producing shoes that entails, in this case too, the production of separate components that can be mutually associated to obtain the upper, to which a sole is subsequently glued.

Both of the described solutions in any case have a member that is provided with counters for the heel and for the toe and is stitched or glued to the upper together with the other components of the shoe.

This conventional method allows a simplified assembly, because the unit constituted by the member and by the nonrigid sock acts as a semifinished item on which various components are then fitted. Several manual stages are, however, still required.

This conventional method also entails stitches or gluing operations for mutually associating the various components.

Furthermore, the manual nature of the described operations does not ensure constant quality of the finished product, since this depends on the skill of the operator.

It is also noted that the external stitches considerably reduce the waterproofing of the shoe.

Furthermore, the cost of the assembly operations is high, and this accordingly causes a high cost of the finished product.

FR-2208279 discloses a method for manufacturing a shoe including molding a plastic material on a semifinished item constituted by an upper connected to a sole member. A problem connected with this method is that the upper has to be firmly associated with the sole member before molding.

Conventional skates are constituted by a cuff rotably associated with a shell, both made of plastics. A soft innerboot is arranged inside the shell and the cuff and a pivoting frame for the wheels, arranged for example in an in-line fashion, is associated with the shell.

The method for manufacturing these products substantially entails molding the shell and the quarter, connecting them, and then inserting the soft innerboot inside them.

DE-3,043,425 discloses a skate which is substantially composed of three separate bodies: a frame adapted to support wheels or an ice-skating blade, a soft innerboot and a rigid insole.

The insole is provided, in the lower part, with adapted pins which, once associated with the innerboot and with the frame, allow the rigid interconnection of the three components of the skate.

The use of this conventional method to fix the innerboot to the frame necessarily requires the presence of a rigid structure, constituted by the insole, inside the innerboot, and this component makes direct contact with the foot.

This hinders the user's comfort as well as the stability of the foot inside the innerboot.

It has in fact been noted that the rigid insole must be formed according to a standard foot shape and therefore cannot optimally adapt to the specific shape of each individual user.

It is also noted that due to the stresses applied during sports practice, the pins are subject to deformations that alter the connection to the other two bodies that compose the skate.

Accordingly, a decrease occurs in the control sensitivity of skate on the part of the user, in the stability of the skate itself, and ultimately also in the safety of the skater.

CA-2,071,806 discloses a shoe for a skate with in-line wheels, comprising a shell that only partially surrounds part of the soft innerboot.

The shape of the shell is such as to substantially have lateral containment regions at the toe and heel of the innerboot and only to a very limited extent on the sides of the foot; this solution allows to extract the soft innerboot while the foot is still inserted therein and is indeed allowed by the limited containment of the innerboot in the middle lateral region.

However, this solution entails drawbacks: the shell thus shaped in fact does not ensure securing of the soft innerboot to the shell, because of the limited number of securing points.

The innerboot can thus move inside the shell and tends to move both longitudinally to the skate and transversely thereto.

These relative movements cannot be compensated by tightening the levers further; therefore, there is a real possibility that the innerboot might slip out of the shell during skating, with conceivable severe consequences for the user.

The relative movements of the soft innerboot inside the shell in any case entail further disadvantages, such as less control and maneuverability of the sports implement, worsened as regards the insufficient lateral containment provided by the shell when the skater performs lateral thrusts to increase his speed or when the brakes with the method known as "side-slip", which entails placing the skate in a direction that is approximately perpendicular to the direction of travel.

CA-2,101,718, filed by Canstar Sports Group Inc., discloses a partial solution to these drawbacks; the patent relates to a skate with in-line wheels the frame whereof is associated to a shell partially surrounding a soft innerboot, said shell having a front toe cup, which partially surrounds the toe of the shoe, and perimetric guiding seats for a first strap that surrounds the upper part of the foot, compressing it, and for a second strap that surrounds the foot instep.

Although these straps allow to retain the innerboot in the shell, preventing its escape, they do not fully eliminate the problem of the relative movements between the two components. Furthermore, the effect of the straps is that the foot is compressed against the bottom of the shell, without being able to make the innerboot optimally adhere laterally to the shell.

During sports practice, the stresses acting on the shell are countless and have different characteristics; accordingly, the user is forced to tighten the strap considerably, but excessively tight closure causes discomfort to the user's foot, such as painful regions where the strap applies its pressure or difficult blood circulation in the foot, because of excessive pressure on the foot.

The only remedy is to avoid tightening the straps too much, but in this case the problem of not having good securing of the innerboot to the shell remains.

WO-95/03101 discloses a shoe for a skate with in-line wheels comprising a shell that only partially surrounds a soft innerboot, which is fixed to the shell by gluing.

A quarter is articulated to the shell and has flaps that surround the tibial region and secure the innerboot by means of an appropriate lever; the shell is laterally provided with two seats for guiding a strap that affects the foot instep region.

This solution, however, also entails drawbacks, such as the industrialization of the step for gluing the innerboot, which is very difficult because of the shapes of the shells to which the innerboot must be glued.

Furthermore, gluing entails imperfect finishing due to the possible presence of smears and smudges of glue on the innerboot along the perimeter of the shell, thus worsening its aesthetic appearance. Furthermore, in the case of production rejects, both the innerboot and the shell cannot be recovered.

Finally, during sports practice the foot tends to move inside the innerboot due to the applied forces; the continuous actions of compression and traction forces entail the gradual separation of the innerboot from the shell, thus causing the innerboot to perform unwanted movements, with a gradual decrease in skate control.

SUMMARY OF THE INVENTION

One aim of the present invention is to solve the described technical problems, eliminating the drawbacks of the mentioned prior art by providing a highly industrializable method that accordingly allows to obtain a shoe while limiting the number of manual assembly stages.

Within the scope of the above aim, an important object is to provide a method that allows to drastically reduce the quantity and areas affected by stitches.

Another important object is to provide a method that provides shoes that have a high and constant quality.

Another important object is to provide a method that provides shoes that have excellent waterproof and comfort characteristics for the user.

Another object is to provide a shoe that is reliable and safe in use and can be obtained with ordinary machines and facilities.

Another aim of the present invention is to solve the above problems, eliminating the drawbacks of the mentioned prior art by providing a method that provides a soft innerboot that is associable with a rigid shell and, once associated therewith, is free from possible relative movements inside the shell, allowing optimum transmission of forces to a supporting frame for the wheels or to a blade.

Within the scope of this aim, an important object is to provide a shoe that allows optimum control and maneuverability of a skate and good lateral containment on the part of the shell, both during skating and during braking with the so-called "side-slip" method.

Another object is to provide a shoe for a skate in which it is possible to combine the characteristics of the soft parts, substantially constituted by the innerboot, with those of the rigid parts, constituted by the shell, so as to minimize the rigid structural parts while maintaining a high level of technical performance and comfort.

Another important object is to provide a method that provides a skate that ensures not only optimum transmission of lateral forces from the innerboot to the shell but also optimum comfort for the skater's foot, preventing compression of the foot as caused by the prior art.

Another object is to provide a method and a shoe that achieve the above characteristics and also allow to avoid the application of localized forces at the metatarsal region or foot instep region and/or compression of the foot against the lower surface of the shell.

Another important object is to provide a method that allows more effective industrialization.

Another object is to provide a shoe the structure whereof allows to obtain a better overall aesthetic appearance.

In accordance with one preferred aspect of the invention, there is provided a method for manufacturing a shoe, which includes the steps of:

arranging an upper-insole assembly about a last;

coupling an intermediate member comprising a toe portion and a heel portion to a lower region of the upper-insole assembly arranged about the last; and arranging the intermediate member in a mold and introducing plastic material into the mold so as to form an injected plastic material member which surrounds the intermediate member and which is integrally connected with both the intermediate member and the upper-insole assembly.

BRIEF DESCRIPTION OF THE DRAWINGS

The particular characteristics and advantages of the invention will become apparent from the following detailed description of particular but not exclusive embodiments of the invention, illustrated only by way of non-limitative example in the accompanying drawings, wherein.

DESCRIPTION OF THE PREFERRED EMBODIMENTS

Figure 1:
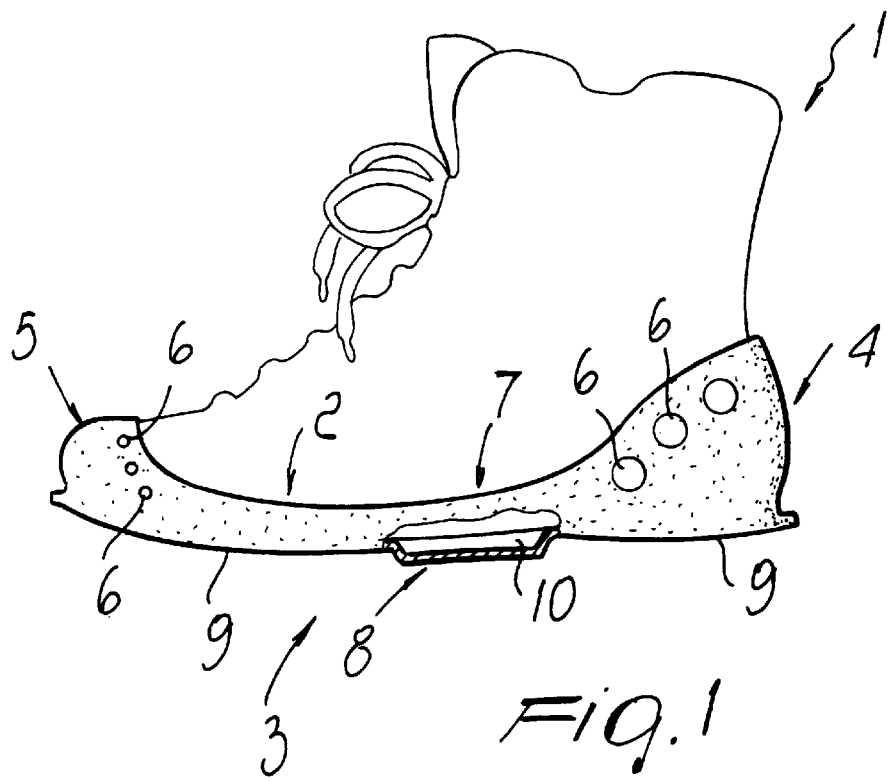
FIG. 1 is a side view of a nonrigid sock, with which an intermediate member is associated, in accordance with a first aspect of the invention.

With reference to the above FIGS. 1–4, a nonrigid sock or an upper, generally designated by the reference numeral 1, has an adapted insole, not shown, and an upper externally associated. The nonrigid sock or upper thus forms an upper-insole assembly 1.

The nonrigid sock or upper 1 is then arranged inside an adapted last, not shown, to tension the upper so as to achieve good adhesion perimetrically with respect to the last.

Then, an intermediate member 2 is dry-coupled to the nonrigid sock or upper 1 and affects the lower region 3 of the upper as well as the heel region 4 and/or the toe region 5, which are connected to each other.

A plurality of first holes 6 are formed at the lateral surface of intermediate member 2. The holes are preferably formed at the heel region 4 and at the toe region 5.

Intermediate member 2 can also have, at the plantar arch region 7, a protrusion 8 that protrudes beyond the lower edge 9 of intermediate member 2. Protrusion 8 forms a cavity 10.

The method then entails placing the intermediate member 2 inside a mold and performing at least one first injection or casting of preferably but not necessarily compact thermoplastic or thermosetting or expandable material, such as single- or multiple-component polyurethane, which overlaps at least at the intermediate member 2.

In a preferred embodiment it is used a bi-component expandable polyurethane injected and subsequently expanded inside the mold.

Figure 2:
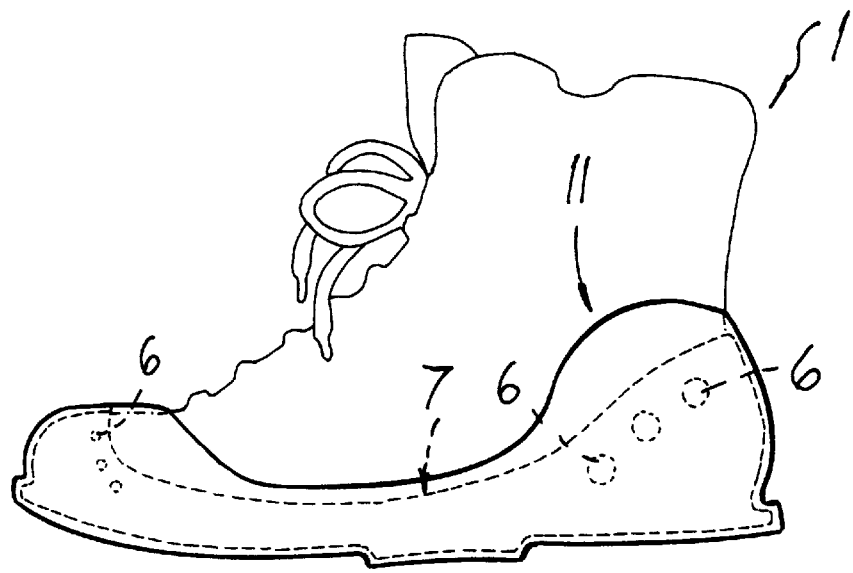
FIG. 2 is a view, similar to the preceding one, of a semifinished item.

A semifinished item is thus produced, generally designated by the reference numeral 11, in which an optimum coupling to the nonrigid sock or upper 1 is achieved, since the thermosetting or thermoplastic or expandable material has penetrated at the holes 6 formed on the intermediate member 2, also, as shown in FIG. 2, affecting part of the surface that is adjacent to the heel region 4 and the toe region 5 of said nonrigid sock or upper 1.

The semifinished item 11 thus obtained has no stitches of any kind, forming a waterproof barrier in the lateral and lower regions of the nonrigid sock or upper 1 and thus in areas that are in direct contact with water during walking.

Figure 3:
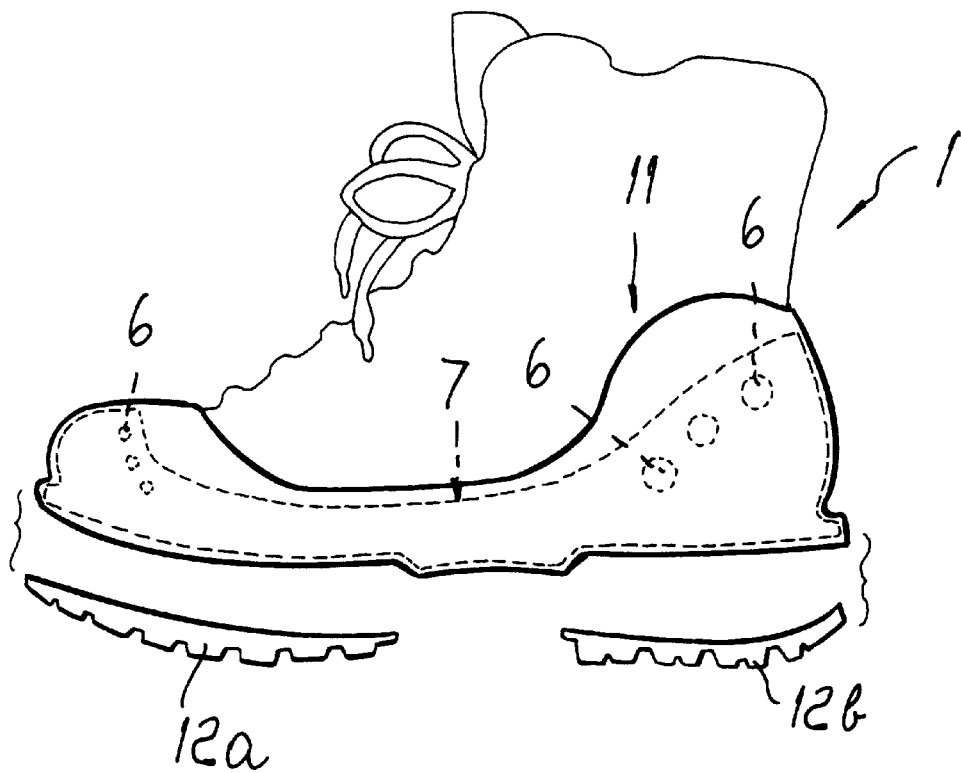
FIG. 3 is a view, similar to the preceding one, of the application, below the semifinished item, of a sole that is constituted by two treads that are associated in the heel and metatarsal region of the semifinished item.
Figure 4:
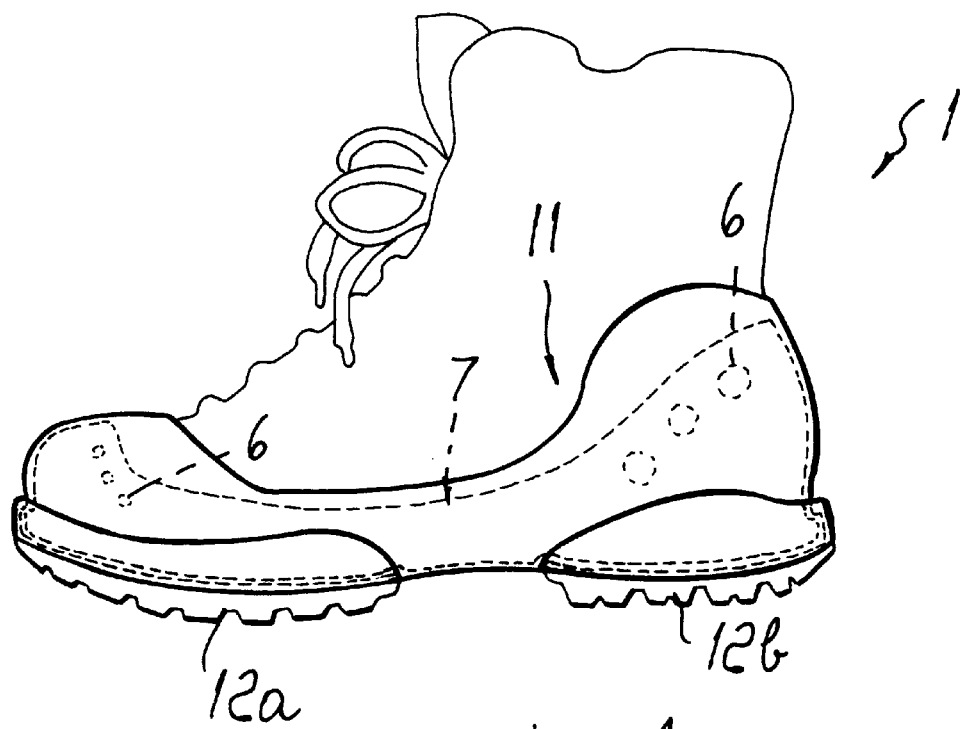
FIG. 4 is a side view of a preferred shoe obtained according to the invention.

A sole or any other sole member, such as a roller skate for example, can be coupled below the semifinished item 11, by means of conventional methods, such as gluing, or by means of the same or of a second injection of foamed thermoplastic material or of expandable material, as better explained hereinafter; in the particular solution shown in FIG. 3, said sole is constituted by two treads 12a and 12b that are coupled at the heel and toe regions.

To increase user comfort, one or more blocks, having the desired flexibility characteristics, may be inserted in cavity 10.

It has thus been observed that the invention has achieved the intended aim and objects, since it allows greater industrialization for the production of the shoe, limiting the number of manual assembly stages and limiting the stitches only to the nonrigid sock or upper or, possibly, only to the coupling of the upper to the nonrigid sock; moreover, this occurs in regions that are not in direct contact with, or in the vicinity of, the ground during walking.

Optimum waterproofing of the shoe is therefore also allowed, whereas the possibility of inserting adapted inserts in the cavity 10 allows to further improve user comfort. The inserts in fact act as shock-absorbing elements in a particularly sensitive region such as the plantar arch region.

An important feature of the method according to the invention is that intermediate member 2 can be coupled to the upper without glue or any other means because its particular shape allows it to remain in position, during the injection-molding.

The method is of course susceptible of numerous modifications and variations, all of which are within the scope of the same inventive concept.

Figure 5:
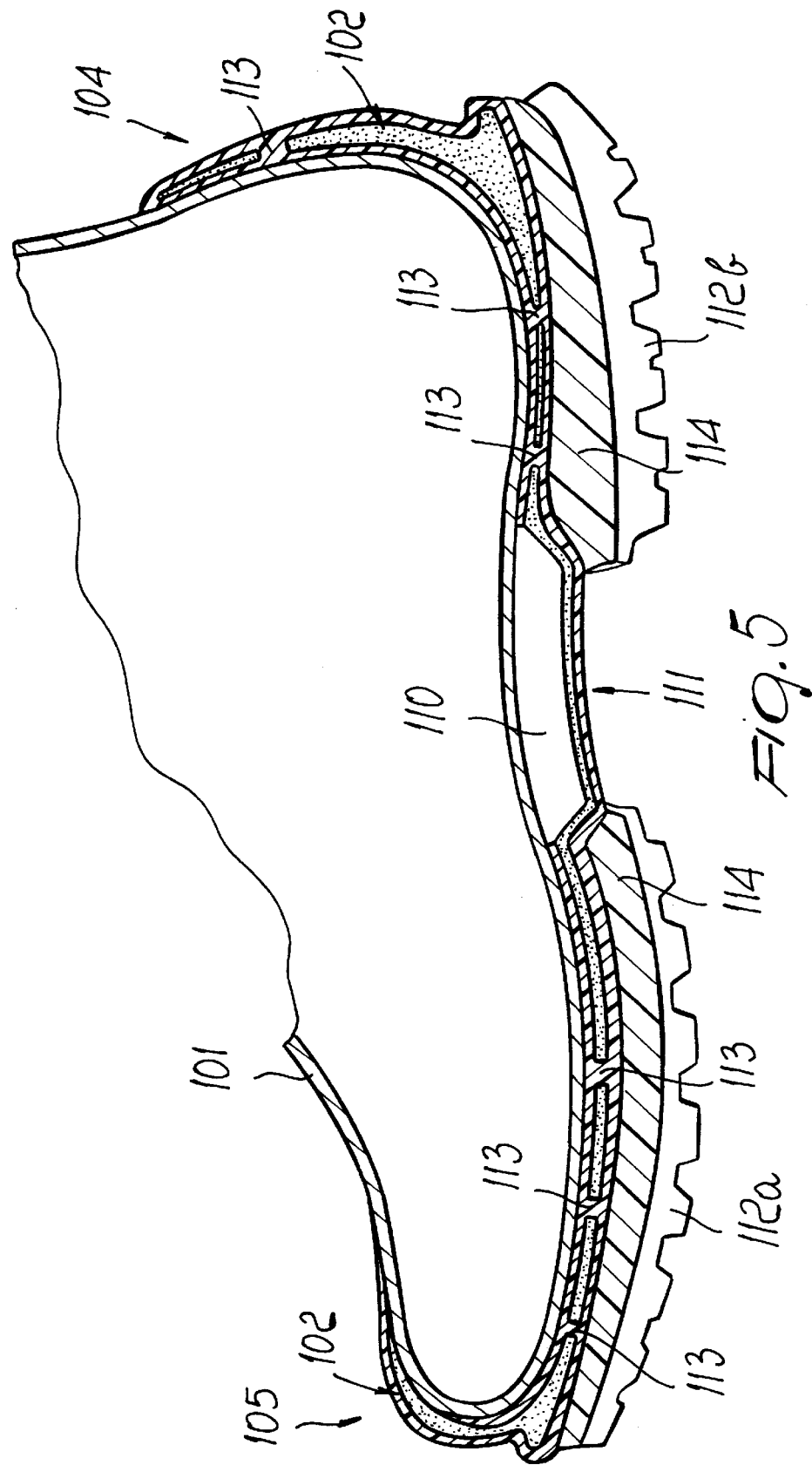
FIG. 5 is a side sectional view, taken along the longitudinal median plane of the shoe according to a further aspect of the invention.

Thus, for example, FIG. 5 illustrates a nonrigid sock or upper 101 that is dry-coupled to an intermediate member 102 provided with adapted second holes 113 that are formed at the region of the sole of the foot and optionally at the heel region 104 and at the toe region 105.

In this embodiment, the intermediate member 102 thus obtained is placed inside a mold to perform a first injection or pouring of preferably but not necessarily compact thermoplastic or thermosetting or expandable material that affects at least said intermediate member 102 and therefore, in addition to the first holes, also affects the second holes 113, so as to facilitate the penetration of the thermoplastic or thermosetting or expandable material in direct contact with the nonrigid sock or upper 101 until it practically surrounds the foot except for the region in which the cavity 110 is formed.

It is also subsequently possible to apply the additional phases described above, and therefore the coupling of a tread 112a and 112b with the optional interposition at the semifinished item 111 of flexible material, such as a foamed or an expandable polyurethane, designated by the reference numeral 114, by means of a second injection.

Flexible material 114 thus allows to cushion impacts during walking, increasing the comfort of the user.

Figure 6:
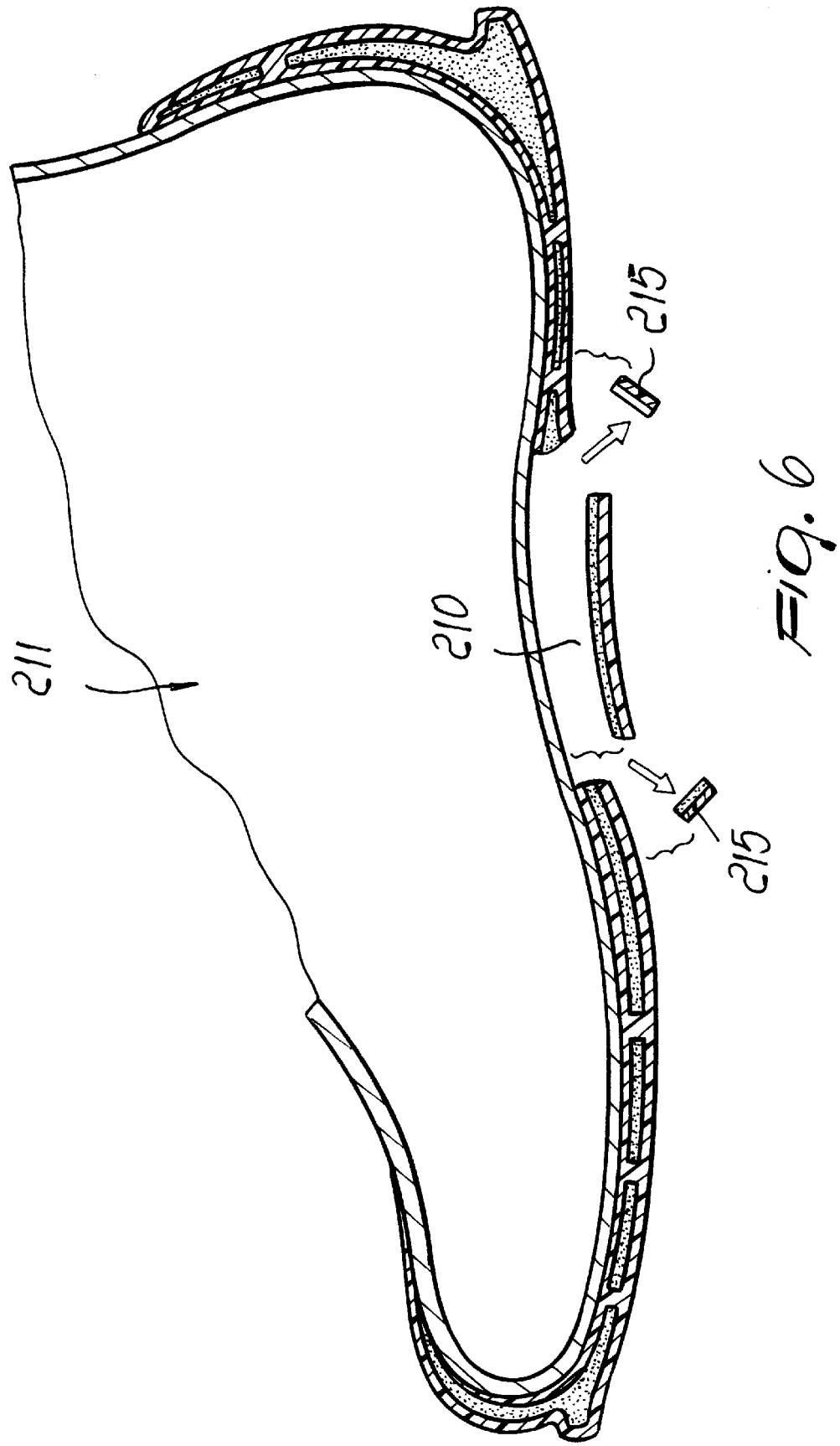
FIG. 6 is a view, similar to FIG. 5, of still a further embodiment of the invention.
Figure 7:
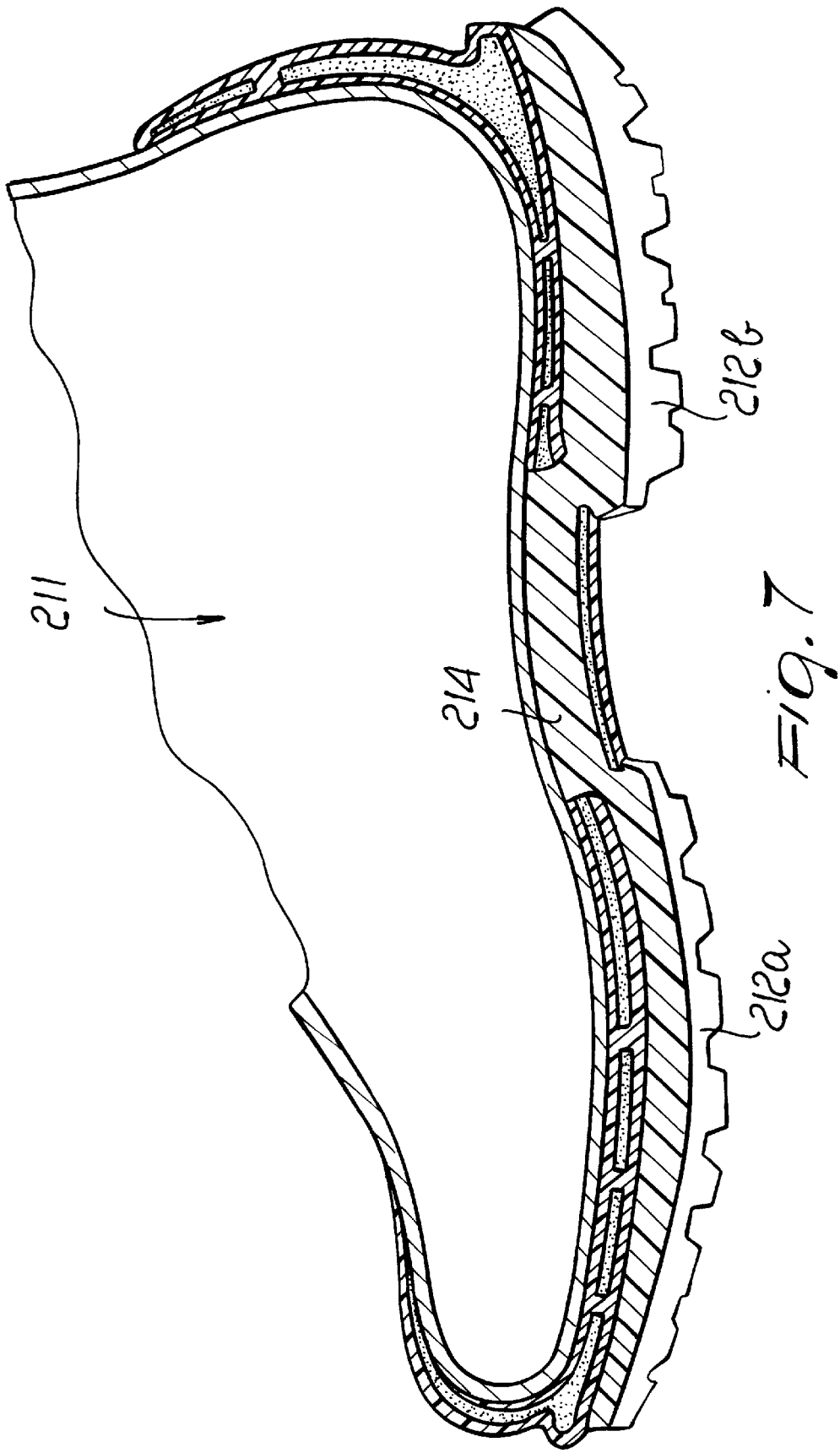
FIG. 7 is a view, similar to the preceding one, of still a further embodiment of the invention.

In another embodiment, shown in FIGS. 6 and 7, the process entails, after obtaining the semifinished item 211, the removal, for example by cutting, of one or more walls 215 that form the cavity 210. The semifinished item 211 is then arranged inside a mold to perform a second injection of flexible material, such as for example foamed or expandable polyurethane, designated by the reference numeral 214, which affects not only the lower regions of the heel and of the toe but also the cavity 210; this is done to further increase the user comfort.

Then, by means of a gluing operation, or prior to the second injection, it is possible to apply the treads 212a and 212b below the flexible material 214. In the second case, the injection of flexible material 214 rigidly couples treads 212a and 212b to semifinished item 211.

In these solutions, too, the method is highly industrialized, with considerable limitation of manual operations, and this allows to achieve a high reduction in production costs, both by virtue of the mechanization of many operations and by virtue of the lower use of expendable materials, such as adhesives and small metal parts, required in the prior art methods for connecting the various components.

The finished product also has a high quality level which is constant in time. Furthermore, precise and infinitely repeatable anatomical shapes can be obtained.

The considerable reduction of the number of stitches is extremely important. None of the stitches is visible, at least in the lateral and lower regions that are adjacent to the sole and in contact with the ground, since they are embedded in the thermoplastic or thermosetting or expandable material during injection or pouring.

A reduction in the number of manual operations also leads to optimal waterproofing of the shoe and good warmth thereof, since there is no discontinuity on the outer surface of the upper, as it happens in conventional shoes because of the stitch holes.

The user comfort is considerably improved, because the materials used for the intermediate member and for the subsequent injections or castings are not in direct contact with the foot and are located outside the nonrigid sock or upper.

Figure 8:
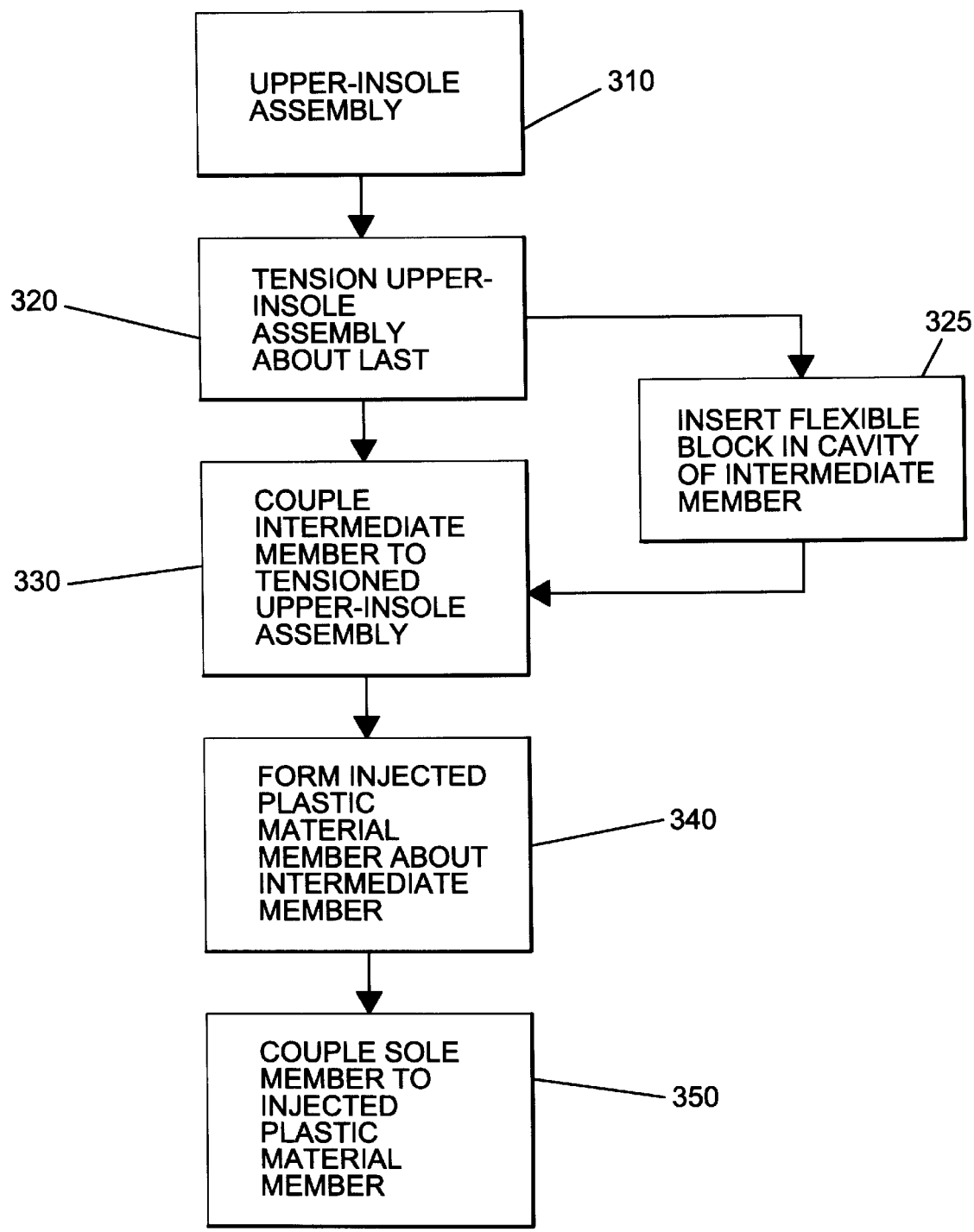
FIG. 8 is a flow diagram illustrating steps of a preferred embodiment of the method according to the invention.

FIG. 8 shows a flow diagram illustrating the steps the method according to the invention. In a first step 310 the upper-insole assembly is provided, and in a second step 320 the upper-insole assembly is tensioned about a last. In a subsequent step 330, the intermediate member is coupled to the bottom portion of the upper-insole assembly tensioned about the last, while the reference numeral 325 indicates the alternative step in which the flexible block element is inserted in the cavity of the intermediate member as previously described. In the subsequent step 340, the injected plastic material member is formed about the intermediate member, and a sole member may be coupled in step 350 to the bottom of the injected plastic material member, in any one of the manners as previously described.

Figure 9:
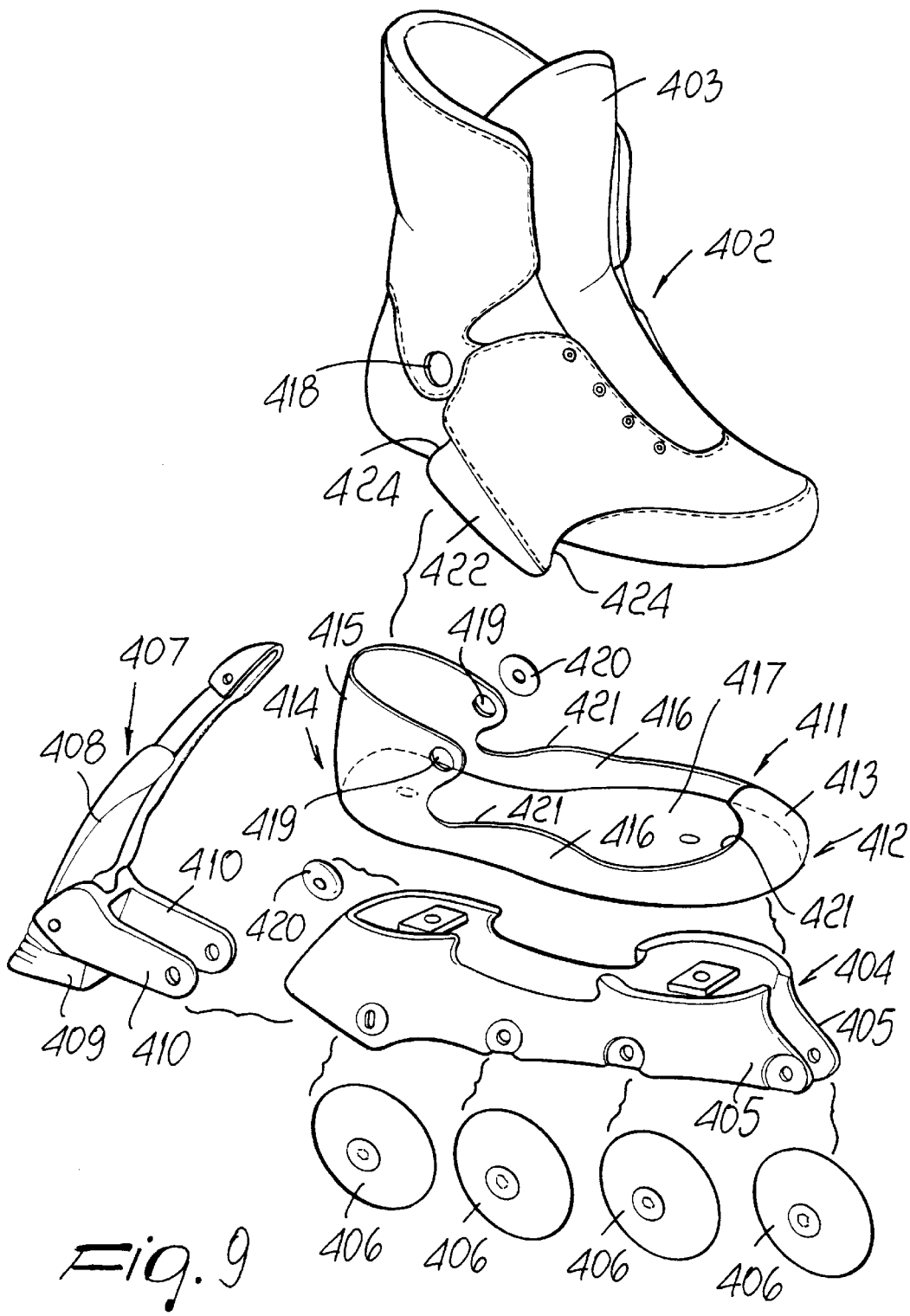
FIG. 9 is an exploded view of the components of a shoe according to a further aspect of the invention, associated to a skate.
Figure 10:
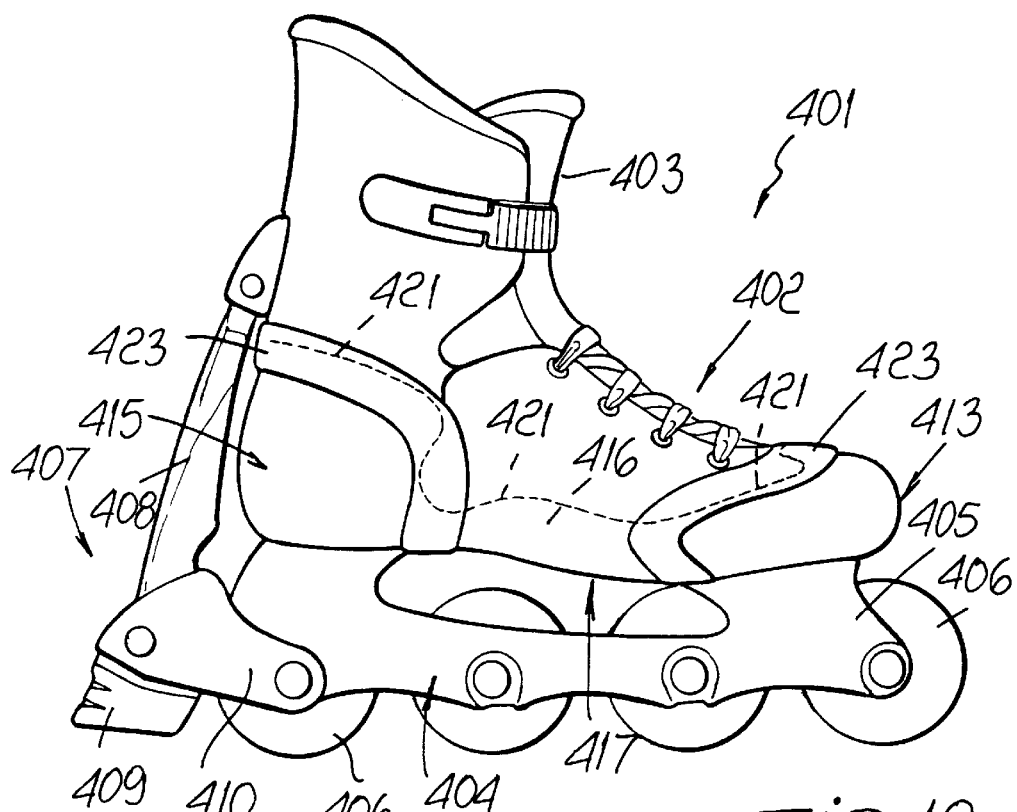
FIG. 10 is a side view of the shoe of FIG. 9 associated to a skate.
Figure 11:
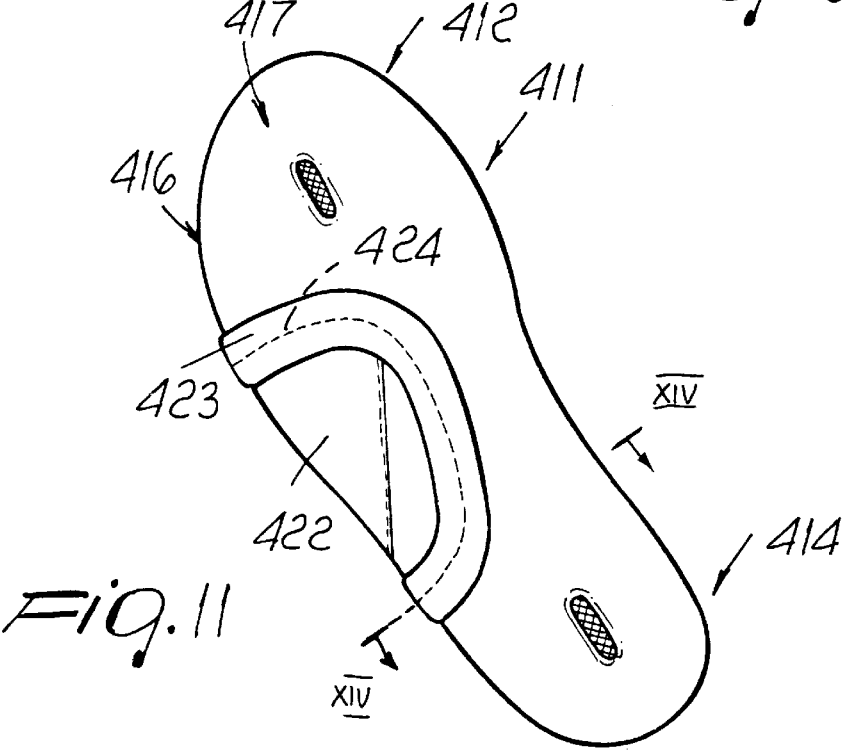
FIG. 11 is a bottom view of a shell of the shoe of FIGS. 9 and 10, with an innerboot associated therewith.

With reference to the above FIGS. 9-11, the reference numeral 401 designates a skate associated to a soft innerboot 402 forming an upper-insole assembly, preferably of the type having a front opening at which a tongue 403 is arranged.

The skate includes a substantially U-shaped frame 404, between whose wings 405 a plurality of wheels 406 are freely rotatably pivoted and are mutually aligned.

A conventional braking device 407 is associated in the rear part of the frame 404 and is constituted for example by a rod 408 that is associated, at one end, with the rear of the innerboot 402 and has, at the other end, a pad 409 that interacts with the ground. Rod 408 has arms 410 that are articulated at one end at the same axis as the last rear wheel 406.

The skate comprises an intermediate member in the form of a rigid shell 411 for partially containing said innerboot 402; the shell has a toe cup 413 at the toe region 412 and a heel containment cup 415 at the heel region 414.

The toe cup 413 and the heel cup 415 are interconnected by means of side walls 416 that protrude perimetrically with respect to the sole 417 and are adapted to partially contain the lower part of the innerboot 402.

The sole 417 is connected to the underlying frame 404 by conventional systems.

Approximately at the malleolar region, the innerboot 402 and the shell 411 have adapted first holes 418 and second holes 419 for mutual articulation by means of rivets or studs 420.

An optional rigid cuff, not shown in the accompanying drawings, can be rotatably connected to the shell 411.

The method for manufacturing the skate 401 includes, optionally in different sequences, the following steps: a first step in which the soft innerboot 402 is positioned on an adapted last, followed by dry assembly of the shell 411 on said innerboot 402.

The innerboot and the shell are interconnected by means of a successive overlap injection-molding or pouring of thermoplastic or thermosetting material at at least part of the edge 421 of the shell 411 and therefore of the edge of the toe cup 413, of the heel cup 415, and of the side walls 416, thus obtaining a ridge 423 that is approximately annular and is preferably closed. The ridge 423 is thus an injected plastic material member which surrounds the rigid shell 411 and is integrally connected with both the rigid shell 411 and the innerboot 402. In the particular embodiment illustrated, the injected plastic material member in the form of the ridge 423 only partially surrounds the rigid shell, for example such that the heel and toe regions of the ridge are left exposed. Moreover, only part of the edge 421 of the shell 411, which edge 421 is an upper perimetric edge of the shell 411, is covered by the ridge 423, since for example the lateral region of the edge 421 as seen in FIG. 10 is not covered by the ridge 423. It is in any case possible to provide an injected plastic material member which completely covers the shell 411, for example in the manner as described for the embodiment as seen in FIGS. 1–4 in which the injected plastic material member formed by the introduction of plastic material completely covers the intermediate member 2. Similarly, it is possible in the previously described embodiments of FIGS. 1–8 to perform the plastic material introduction so as to form an injected plastic material member which only partially surrounds the intermediate member, and which only partially covers the upper perimetric edge of the intermediate member, for example in the manner as described for the embodiment of FIGS. 9–11. Furthermore, the assembly of the upper-insole assembly/intermediate member/injected plastic material member of the embodiment of FIGS. 9–11 may be adapted for example for use in a sports shoe for walking and/or running, while the assemblies of the upper-insole assembly/intermediate member/injected plastic material member of the embodiments of FIGS. 1–8 may be adapted for example for use in a sports shoe for rolling and/or ice skating. The various assemblies of the upper-insole assembly/intermediate member/injected plastic material member as disclosed herein may be adapted for use in any type of shoe.

In the particular illustrated embodiment of FIGS. 911, at the outer side of the foot, the soft innerboot 402 has a tab 422 that can be arranged outside the side wall 416 and can be partially folded at the sole 417 of the shell 411, as shown in FIG. 11.

In the particular solution shown in the drawings, the coupling between the innerboot and the shell occurs by overlap injection-molding or pouring of thermoplastic material so as to form a ridge 423 that affects the entire edge of the shell 415, then affects the lateral edge 424 of the tab 422, then passes below the shell 411 so as to affect the sole 417, blending with the edge 421 of the toe cup 413, and then affects the edge 421 of the other side wall 416 of said shell 411 so as to achieve a closed-loop shape.

It has thus been observed that the method and the product obtained thereby have achieved the intended aim and objects, since the method allows to provide a shoe that is constituted by a soft innerboot that can be associated with a rigid shell so as to prevent any relative movements inside said shell, at the same time allowing optimum transmission of forces to the wheel supporting frame or to a blade.

A skate structure is thus obtained that allows optimum control and maneuverability and good lateral containment both during skating and during braking according to the so-called "side-slip" method.

The ridge 423 can also be used as a protective, shockproof, and abrasion-resistant element for the skate.

The method allows to obtain a skate that provides optimum comfort for the skater's foot, preventing its compression.

The method and the shoe according to the invention are susceptible of numerous modifications and variations within the scope of the appended claims.

Figure 12:
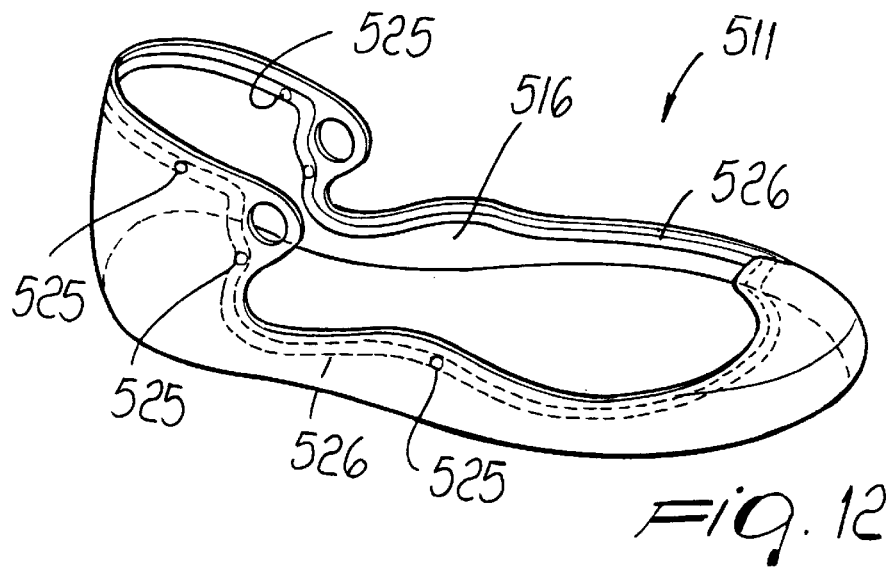
FIG. 12 is a lateral perspective view of a shoe shell in a further embodiment of the invention.
Figure 13:
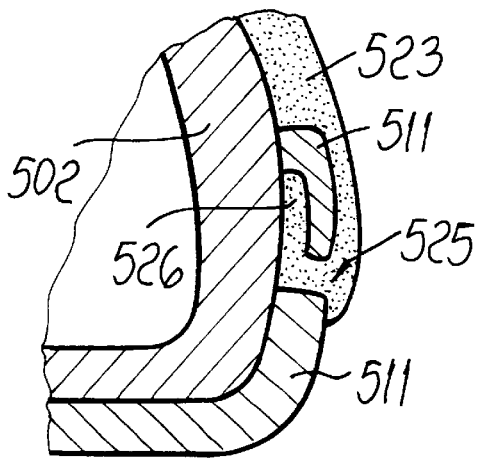
FIG. 13 is a sectional view of a detail of a shoe innerboot, illustrating the connection between the innerboot and the shell of FIG. 12.

Thus, for example, FIGS. 12 and 13 illustrate a different embodiment regarding the manufacturing of the shell 511. At the regions affected by the overlap injection-molding mentioned earlier, the shell has adapted openings 525 that pass through the thickness of the shell 511 and are advantageously connected to adapted channels 526 adapted to facilitate and orientate the flow of the thermoplastic or thermosetting material that constitutes the ridge 523.

In this manner, said overlap injection-molding or pouring follows, as regards the flow of the plastic material, a preferential and controlled path that is adapted to ensure perfect adhesion between the shell and the innerboot 502.

The channels 526 can be provided for example preferably at the regions that are stressed most intensely during sports practice.

The openings 525 and the channels 526 therefore allow to form regions of greater or lower adhesion, varying the dimensions and/or the positioning of the openings of said channels.

Furthermore, the thickness of thermoplastic material that forms internally between the shell and the innerboot does not decrease the fit of said innerboot and does not produce uncontrollable localized pressure points, thanks to the presence and extrinsic shape of the channels that form a sort of containment chamber for the thermoplastic material.

Figure 14:
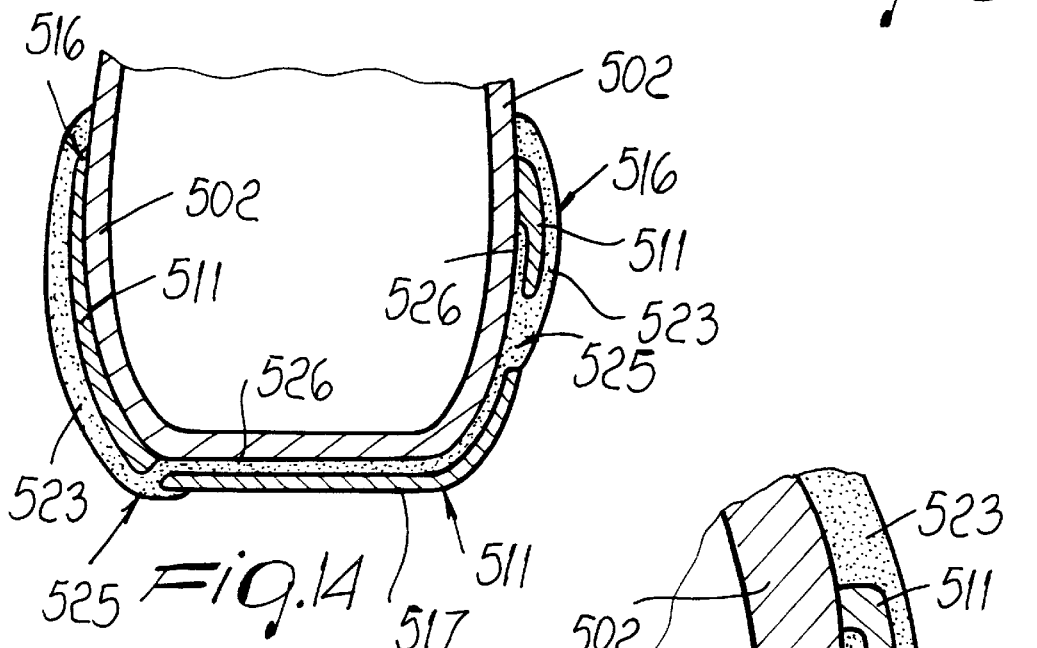
FIG. 14 is a sectional view of a further embodiment of the shoe, taken along the plane VI—VI of FIG. 11.

In the particular solution shown in FIG. 14, an opening 525 and a channel 526 are formed at the sole 517 of the shell 511; this causes the mutual adhesion not only of the side walls 516 but also of one or more regions for resting the sole of the foot.

The external appearance of the skate is much more pleasant than conventional skates, since the rigid components contained therein are not present thanks to the limited size of the shell.

The use of the tab 422, shown in the previous figure, allows to conceal the shell; this can also be achieved by varying the thickness and/or height of the ridge 423.

Figure 15:
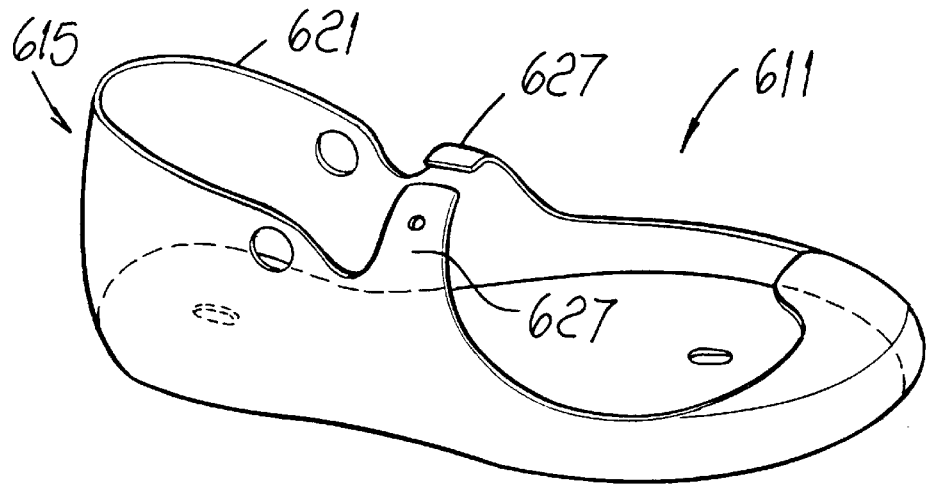
FIG. 15 is a lateral perspective view of a shoe shell in a further embodiment of the invention.
Figure 16:
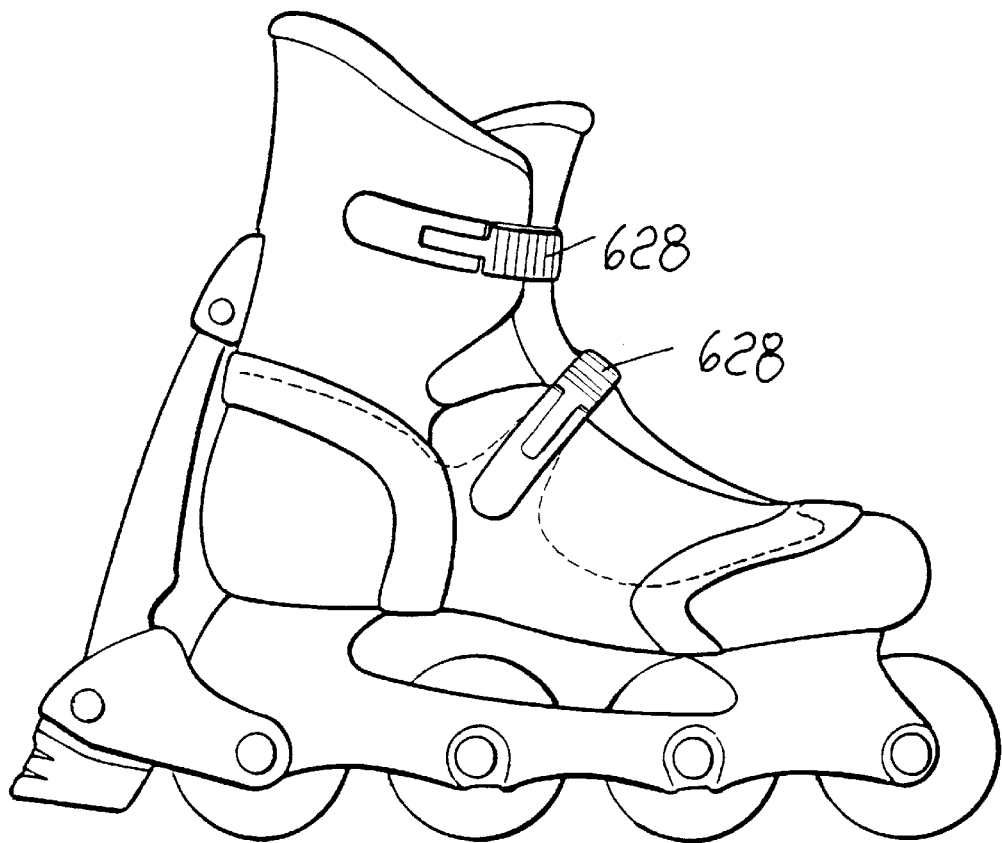
FIG. 16 is a side view of still a further embodiment of a shoe in accordance with the invention.

FIGS. 15 and 16 illustrate a further embodiment for a shell 611 which, differently from the previous one where laces are used to close the foot instep region, has at least one pair of straps 627 protruding from the perimetric region 621 in a region that is adjacent to the heel cup 615; said straps, which are thus arranged approximately transversely to the shell, support a conventional lever fastening device 628.

A lever fastening device can also be used in a shoe comprising a shell of the type designated by the reference numeral 411; in this case it is necessary to provide, at the fixing points of the device, adapted rigid plates inserted in the innerboot 402.

What is claimed is:

1. A method of manufacturing a shoe item, comprising the steps of:

arranging an upper-insole assembly about a last;

coupling an intermediate member comprising a toe portion and a heel portion to a lower region of said upper-insole assembly arranged about said last;

arranging said intermediate member in a mold and introducing plastic material into said mold so as to form an injected plastic material member which surrounds said intermediate member and which is integrally connected with both said intermediate member and said upper-insole assembly, and such that an upper perimetric edge of said intermediate member is completely covered by said injected plastic material member and such that said injected plastic material member is integrally connected to said upper-insole above the upper perimetric edge of said intermediate member.

2. A method of manufacturing a shoe item, comprising the steps of:

arranging an upper-insole assembly about a last;

coupling an intermediate member comprising a toe portion and a heel portion to a lower region of said upper-insole assembly arranged about said last;

arranging said intermediate member in a mold and introducing plastic material into said mold so as to form an injected plastic material member which surrounds said intermediate member and which is integrally connected with both said intermediate member and said upper-insole assembly, and such that an upper perimetric edge of said intermediate member is only partially covered by said injected plastic material member and such that said injected plastic material member is integrally connected to said upper-insole above the portions of said upper perimetric edge of said intermediate member which are covered by said injected plastic material member.

3. A method of manufacturing a shoe item, comprising the steps of:

arranging an upper-insole assembly about a last and tensioning said upper-insole assembly about said last;

coupling an intermediate member comprising a toe portion and a heel portion to a lower region of said upper-insole assembly tensioned about said last;

arranging said intermediate member in a mold and introducing plastic material into said mold so as to form an injected plastic material member which surrounds said intermediate member and which is integrally connected with both said intermediate member and said upper-insole assembly, and such that an upper perimetric edge of said intermediate member is completely covered by said injected plastic material member and such that said injected plastic material member is integrally connected to said upper-insole above the upper perimetric edge of said intermediate member.

4. A method of manufacturing a shoe item, comprising the steps of:

arranging an upper-insole assembly about a last and tensioning said upper-insole assembly about said last;

coupling an intermediate member comprising a toe portion and a heel portion to a lower region of said upper-insole assembly tensioned about said last;

arranging said intermediate member in a mold and introducing plastic material into said mold so as to form an injected plastic material member which surrounds said intermediate member and which is integrally connected with both said intermediate member and said upper-insole assembly, and such that an upper perimetric edge of said intermediate member is only partially covered by said injected plastic material member and such that said injected plastic material member is integrally connected to said upper-insole above the portions of said upper perimetric edge of said intermediate member which are covered by said injected plastic material member.

* * * * *

UNITED STATES PATENT AND TRADEMARK OFFICE
CERTIFICATE OF CORRECTION

PATENT NO. : 6,149,852
DATED : November 21, 2000
INVENTOR(S) : ROMANATO et al.

It is certified that error appears in the above-identified patent and that said Letters Patent is hereby corrected as shown below:

[30] Foreign Application Priority Data

May 30, 1995      [IT]    Italy    ... ... ... ... ... ... ...    TV95A000062

December 27, 1995   [IT]    Italy    ... ... ... ... ... ... ...    TV95A000166

Signed and Sealed this

Twenty-fourth Day of April, 2001

*Attest:*

NICHOLAS P. GODICI

*Attesting Officer*     Acting Director of the United States Patent and Trademark Office